United States Patent [19]

Belanger et al.

[11] 4,424,602

[45] Jan. 10, 1984

[54] CAR WASHING APPARATUS

[75] Inventors: James A. Belanger, Northville; Robert J. Wentworth, Ann Arbor; Graham J. Astley, Novi, all of Mich.

[73] Assignee: Belanger, Inc., Northville, Mich.

[21] Appl. No.: 383,925

[22] Filed: Jun. 2, 1982

Related U.S. Application Data

[63] Continuation-in-part of Ser. No. 309,283, Oct. 7, 1981, abandoned.

[51] Int. Cl.³ ............................................. B60S 3/06
[52] U.S. Cl. .............................. 15/97 B; 15/53 AB; 15/DIG. 2
[58] Field of Search ............... 15/53 A, 53 AB, 97 B, 15/DIG. 2; 134/6

[56] References Cited

U.S. PATENT DOCUMENTS

| | | | |
|---|---|---|---|
| 3,540,069 | 11/1970 | Grant | 15/53 AB |
| 3,662,419 | 5/1972 | Dini | 15/53 A |
| 3,772,725 | 11/1973 | Shelstad | 15/53 AB |

Primary Examiner—Edward L. Roberts
Attorney, Agent, or Firm—Cullen, Sloman, Cantor, Grauer, Scott & Rutherford

[57] ABSTRACT

As a car moves along a path through a wash area, it engages a pair of rotating cloth scrubbing wheels. Each wheel depends from a carriage movable along a horizontal boom pivotally mounted at one end upon a standard located at each side of the wash area. Each boom is pivoted upon a vertical axis and is swingable in a horizontal plane between a first position angular to the path and a second position parallel to the path. Each carriage is biased towards the free end of the boom whereby engagement of the car causes the boom to rotate outwardly while the wheel moves over and engages the front of the car, until the wheel engages the front corner of the car thereby operating a limit switch as a result of car movement which shifts a three-way valve to release the pressure on the carriage cylinder. The carriage moves up the boom towards the pivoted end thereof as the boom swings into a path generally parallel to the car whereby the wheel operatively engages the side of the car to the rear corner thereof. Upon actuation of the limit switch and valve, the carriage is moved by its energized cylinder towards the free end of the boom as the wheel cleans the rear of the car to the center thereof and as the boom is swung towards the center to the first position.

19 Claims, 14 Drawing Figures

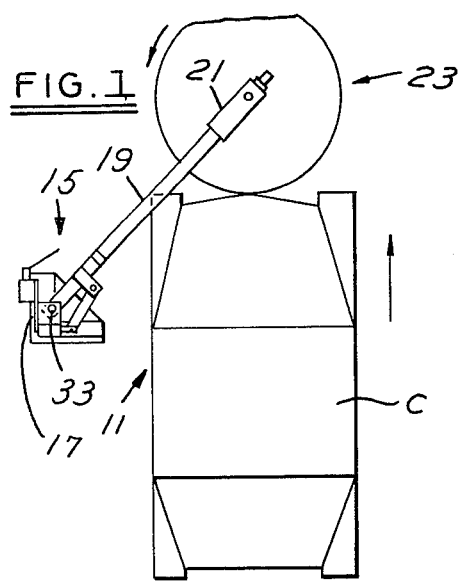
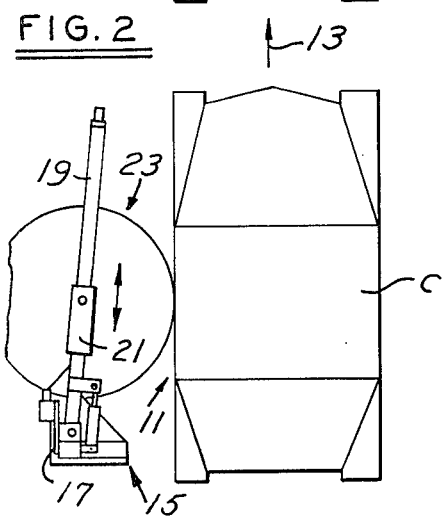
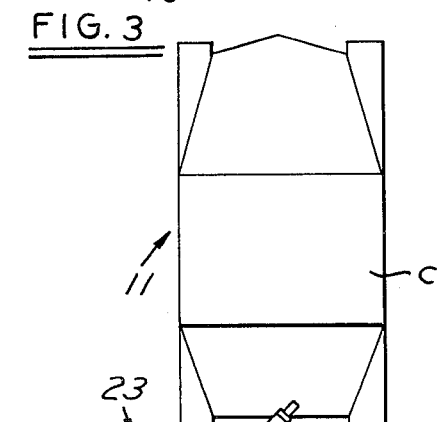
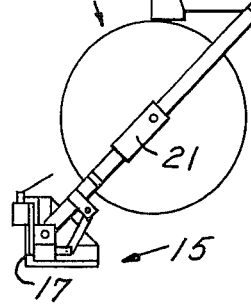
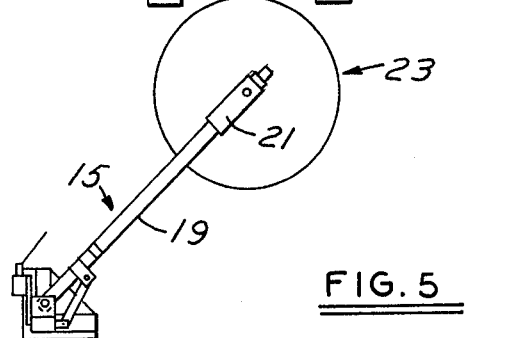
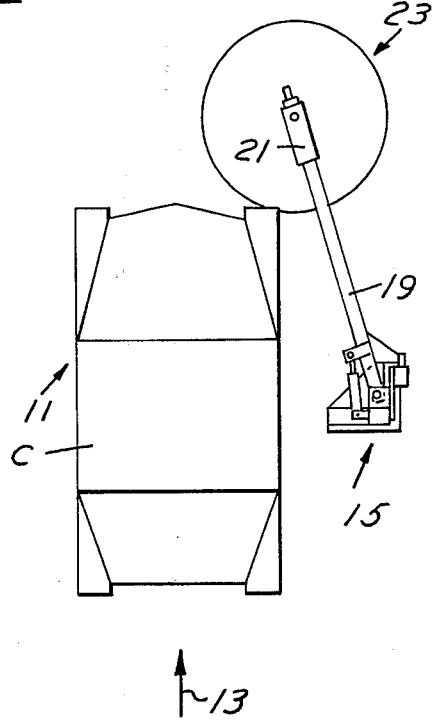

CAR TRAVEL

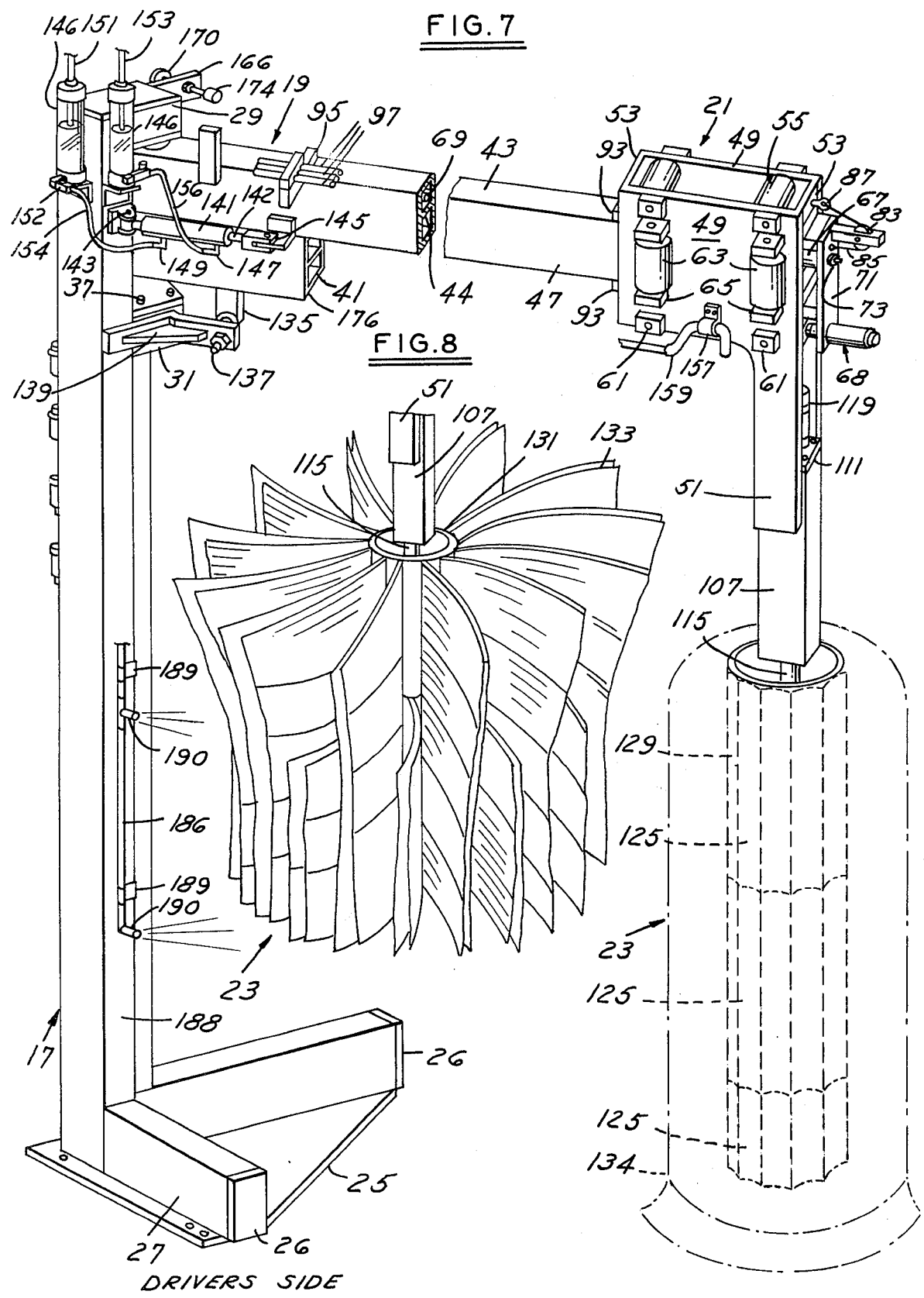

CAR WASHING APPARATUS

CROSS-REFERENCE TO RELATED APPLICATION

This application is a continuation-in-part application of Applicants' copending application Ser. No. 309,283 entitled "Car Washing Apparatus", filed in the U.S. Patent & Trademark Office on Oct. 7, 1981, now abandoned.

BACKGROUND OF THE INVENTION

1. Field of the Invention

This invention relates to a car washing apparatus and more particularly to cloth car wash equipment having a wrap around motor operated cloth wheel assembly for scrubbing the front, one side and rear of a vehicle body.

2. Description of the Prior Art

One type of automatic car washing apparatus is shown in U.S. Pat. No. 3,772,725 which issued to Richard J. Shelstad on Nov. 20, 1973. A pair of car washing apparatuses are employed on opposite sides of the car wash bay or area, with each apparatus having a rotary brush which is rotated on a generally vertical axis. Each brush is suspended from a carriage which is axially movable along an overhead boom. The booms are positioned in sequential order on opposite sides of the wash bay. As a car or vehicle moves along a predetermined path through the wash bay or area, it sequentially engages the oppositely rotating brushes which scrub the front, sides and back of the car.

As the car or vehicle moves through the wash bay, the booms are moved so that each of the brushes first scrubs laterally and outwardly from the center of the car, then longitudinally along one side of the car and then laterally and inwardly along the back of the car to the center thereof.

In the Shelstad U.S. Pat. No. 3,772,725, the respective booms are each mounted upon a longitudinal generally vertical axis which is located at a small angle to the vertical (e.g. about 4.5 degrees). Each boom is inclined downwardly and inwardly so that the respective carriage upon the boom is normally biased by gravity towards the free end thereof. Also each boom is provided with control means including a fluid cylinder or motion damper connected to the boom to control the rate at which the boom returns toward the starting position so that a substantially constant force is maintained between the brush and the car. The cylinder or damper has conventional fluid flow control means which provides substantially unrestricted flow during extension of the piston rod provided in the cylinder as the boom swings towards the retracted position and restricts the fluid flow to control the retraction as the boom is swung back toward the starting position.

One of the difficulties with this construction is that movement of the brush supporting carriage towards the free end of the boom is controlled by gravity. Such apparatus also requires elaborate and expensive controls and component parts. In addition such equipment requires frequent maintenance and replacements of parts and components.

Other examples of prior art wash apparatuses or equipment are found in the following U.S. patents:

| U.S. Pat. No. | Inventor | Title | Year Issue Date |
|---|---|---|---|
| 3,350,733 | Hanna | Car Washing Apparatus | 1967 |
| 3,540,069 | Grant | Automobile Side and Rear Washing Apparatus | 1970 |
| 3,570,034 | Lanfrankie | Car Washing Apparatus | 1971 |
| 3,626,537 | Wilson | Gravity Operated Car Wash With Releasable Brush Means | 1971 |
| 3,662,419 | Dini | Car Washing Apparatus | 1972 |

The prior art further includes the West German Patent No. 1,951,067 of October, 1970 (Ceccato et al).

BRIEF SUMMARY OF THE INVENTION

An important feature of the present invention is to provide an improved car washing apparatus for successively scrubbing the front, side and back of a car or vehicle body during movement along a path where a pair of oppositely rotating cloth scrubbing wheels are rotated upon vertical axes. Each wheel is suspended from a carriage movably mounted upon a boom, with the boom swingable in a horizontal plane between a first position inclined transversely with respect to the path of movement of the car and a second position which is substantially parallel with the path of movement of the car.

Another feature of the present invention is to provide a car washing apparatus wherein the boom is mounted for pivotal movement upon a vertical axis so as to maintain the boom at all times in a single horizontal plane while movable between the first and second positions.

A further feature of the present invention is to provide a car washing apparatus having a carriage for supporting a motor operated cloth scrubbing wheel for registry with successive portions of the car or vehicle body, with the carriage being reciprocally mounted for longitudinal movement along the boom. Pneumatic biasing means are provided for normally urging the boom to the first position inclined transversely to the path of movement of the car with the cloth scrubbing wheel depending from the carriage arranged centrally of the path of the vehicle moving through the wash area.

A still further feature of the present invention is to provide a car washing apparatus of the aforementioned type having a control system or circuit including a fluid or pneumatically operated cylinder for biasing the carriage to an outermost position adjacent the free end of the boom for proper positioning of the rotating cloth scrubbing wheel on the longitudinal path which corresponds to the center of the car.

Another feature of the present invention is to provide a car washing apparatus of the aforementioned type wherein with the fluid or pneumatic cylinder of the control system or circuit extended and the rotating cloth scrubbing wheel located in registry with the center of the vehicle, upon forward advancing of the vehicle or car through the wash area, a limit switch of the control circuit is tripped by the boom which results in the fluid or air pressure in the cylinder being released or vented upon the shifting of the three way valve of the pneumatic-hydraulic control circuit. The cloth wheel scrubs first a portion of the front of the car body from the center line to the side. As the carriage advances towards the pivoted end of the boom, the boom swings towards the second position generally parallel to the longitudinal path of movement of the car and the cloth wheel scrubs the side of the car from the front to the back until the limit switch is again tripped and the boom is urged to the first position with the boom extending transversely across the longitudinal path.

When the limit switch is tripped, the valve is shifted to again pressurize the cylinder to urge the carriage towards the free end of the boom. When this occurs, the rotating wheel scrubs the rear of the vehicle from the side towards the center line.

A further feature of the present invention is to provide a car washing apparatus having a novel fluid control system or circuit including first fluid control means connected between the boom and stationary mounting therefor for controlling angular movement of the boom between the aforementioned first and second positions and second fluid control means connected between the boom and carriage for controlling movement of the carriage on the boom in one direction towards the free end of the boom.

A still further feature of the present invention is to provide a car washing apparatus which includes a pneumatic cylinder connected to a pressurized air source for normally biasing the boom to its transverse angular position, and to further provide a pneumatic cylinder for yieldably biasing the carriage towards the free end of the boom to its starting position.

BRIEF DESCRIPTION OF THE DRAWINGS

FIGS. 1–5 inclusive are fragmentary diagrammatic plan views of one or a pair of longitudinally spaced car washing apparatuses in different operating positions along the wash area of a car wash structure, one apparatus being located on each side of the longitudinal path through the wash area, with each apparatus having a rotatable cloth scrubbing wheel supported by and depending from a carriage which is movable longitudinally along a boom in response to the car movement for successively scrubbing portions of the front, sides and back of a car body during movement of the car along the longitudinal path through the wash area;

FIG. 7 is a fragmentary perspective view of the car washing apparatus taken from one side thereof, partly broken away and in section;

FIG. 8 is a fragmentary perspective view of the rotatable cloth scrubbing wheel in a rotating mode;

Figure 6:
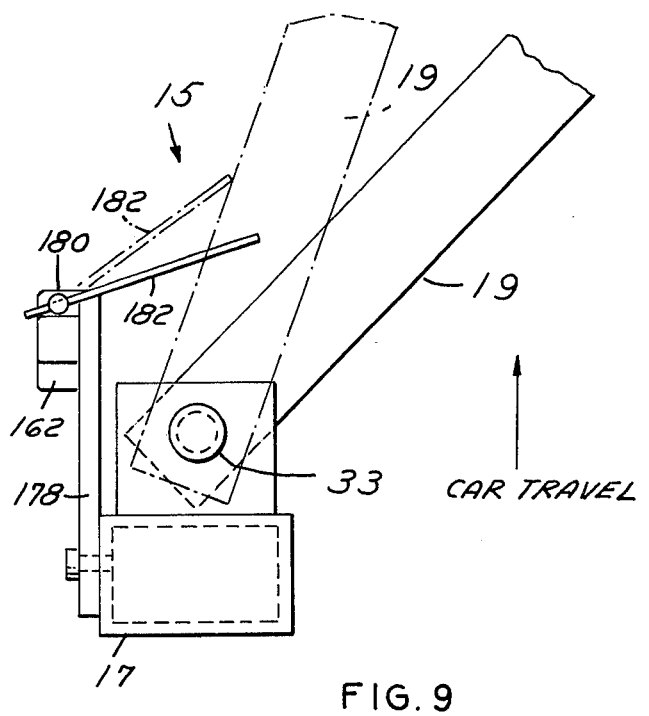
FIG. 6 is a fragmentary plan view of a car washing apparatus on an enlarged scale, showing in solid lines the boom spaced from the wand of the limit switch and also showing in dotted lines the boom, responsive to car movement, in engagement with the wand to thereby activate the limit switch and in turn to shift the three-way valve of the pneumatic-hydraulic control circuit of FIG. 14.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Referring to the drawings, FIGS. 1 through 5 schematically indicate a wash area or bay 11 for a car or vehicle C which moves along a longitudinal path 13, usually upon conventional tracks, driven or moved by a conveyor, not shown, and with respect to a pair of car washing apparatuses or assemblies 15, such as shown in FIGS. 1 and 4, located on opposite sides of the path 13 and bay 11. In actual use, the car washing apparatus 15 of FIG. 4, is not opposite from the assembly 15 in FIG. 1, but is sequentially disposed rearwardly thereof so as to prevent interference with the corresponding wrap around cloth scrubbing wheels 23 of the respective car washing apparatuses 15.

Each car washing apparatus 15 includes an upright standard 17 arranged to one side of the wash area 11, including an elongated tubular boom 19 adapted for swinging movement in a horizontal plane to a starting or first position, such as shown in FIG. 1. The boom is inclined angularly and transversely of path 13 and in a second position, such as shown in FIG. 2, the boom is substantially parallel to the path 13. The side walls of the boom are parallel at all times to a vertical plane.

Figure 10:
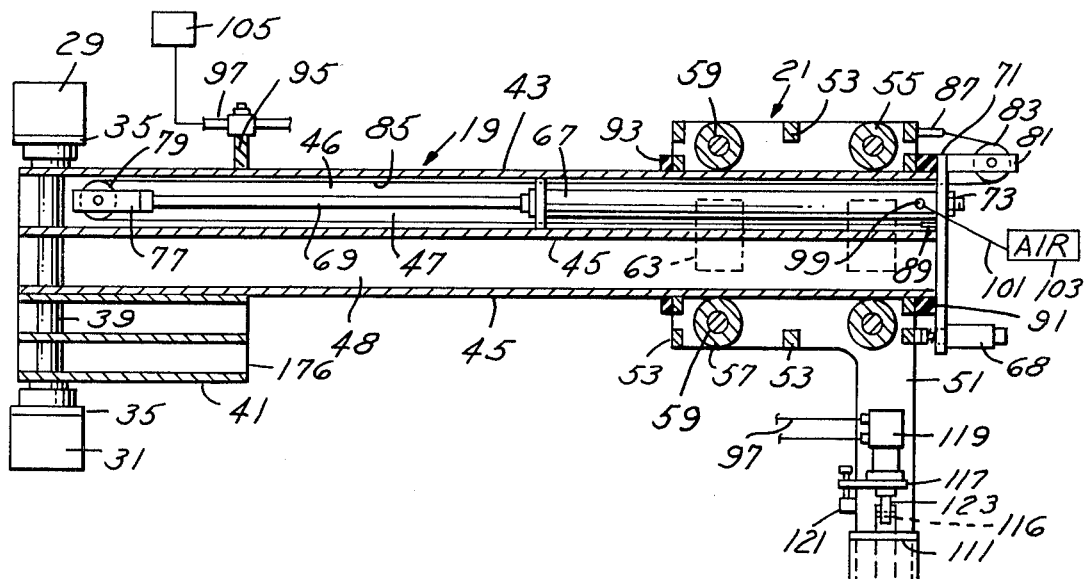
FIG. 10 is a fragmentary longitudinal sectional view through the boom and the carriage of the car washing apparatus illustrated in FIG. 7, with the carriage located at the free end of the boom as in FIGS. 1, 4 and 5.
Figure 11:
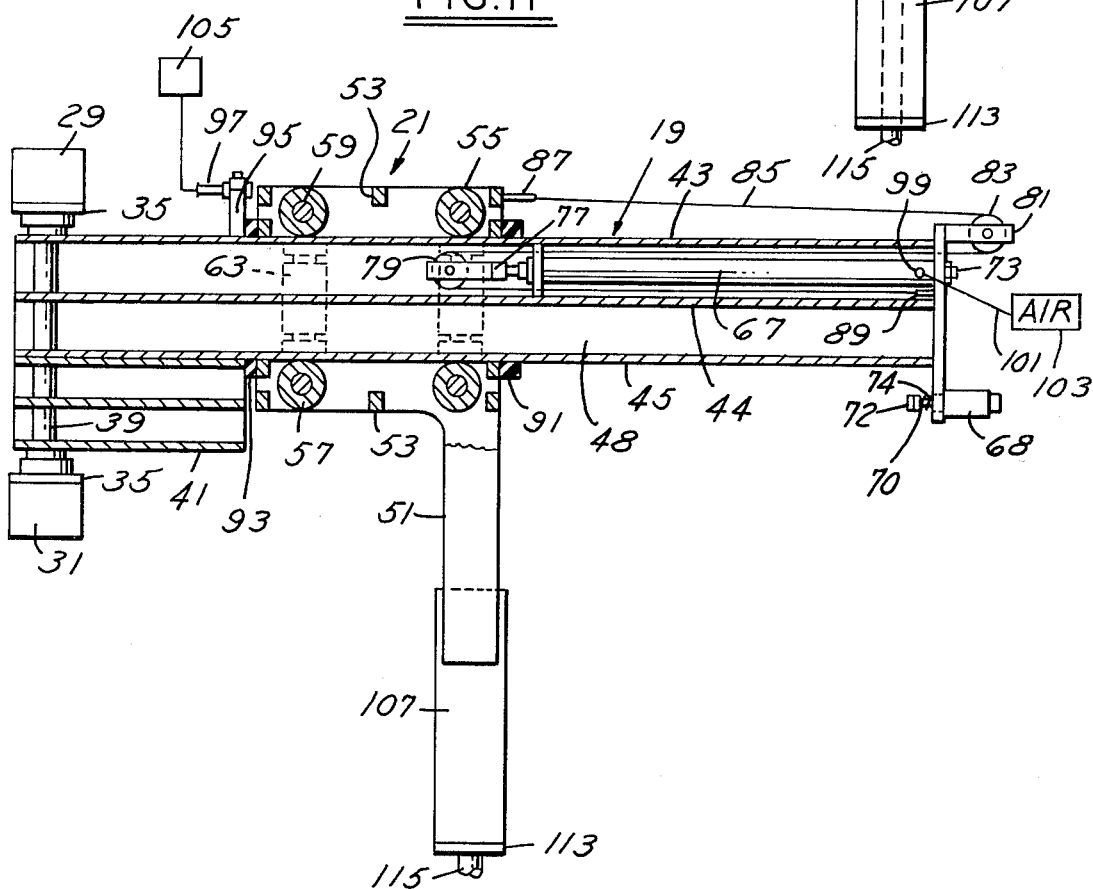
FIG. 11 is another fragmentary longitudinal sectional view through the boom and carriage of the car washing apparatus illustrated in FIG. 7, with the carriage located adjacent the fixed end of the boom as in FIG. 2.

Carriage 21, shown in detail in FIGS. 7, 10 and 11, rolls on or is movably and guidably mounted upon the boom 19 by means of rollers 55 and 57 and is adapted to support a power rotated wrap around cloth scrubbing wheel 23, which in the starting position shown in FIG. 1, is centrally disposed with respect to the car C and the longitudinal path 13.

Standard 17 includes a pair of right angularly related tubular base elements 27, one of which extends at right angles to the longitudinal path 13 and the other extends parallel to the path 13. A triangular base plate 25 underlies the base elements 27 and is suitably secured thereto as by welding. End caps 26 close the ends of base elements 27, as shown in FIG. 7.

A pair of vertically spaced trunnion mount tubes 29 and 31 of rectangular cross section project from standard 17 adjacent its upper end, being generally parallel to the longitudinal path 13. A pair of opposed spaced bearings 35 are secured as at 37, FIG. 7, to the respective trunnion mount tubes 29, 31 and supportably receive and journal pivot pin 39, FIGS. 10 and 11, which extends thereinto and through the boom 19 and the corresponding stop on spacer tube or bracket 41. This completes the pivot assembly generally indicated at 33, FIGS. 1 through 5.

As illustrated in FIGS. 7, 10 and 11, the elongated tubular boom 19 is a beam of honeycomb, hollow shape or construction throughout its length and includes horizontal top, intermediate and bottom walls 43, 44 and 45 respectively and the vertical side walls 47. The intermediate wall 44 divides the beam or boom into a pair of upper and lower tubular compartments or honeycombs 46 and 48 respectively. The walls 47 are parallel and are located in vertical planes at all times.

The carriage 21 includes a pair of spaced upright or vertical side plates 49, FIG. 7, having at one end a pair of vertically extending support arms or portions 51 which depend therefrom. The side plates 49 are spaced apart by a plurality of transverse spacers or elements 53 secured to the side plates 49 as shown in FIGS. 7 and 11.

A pair of longitudinally spaced transverse top rollers 55 engage the top wall 43 and a corresponding pair of longitudinally spaced bottom rollers 57 engage the bottom wall 45 of the boom 19. The respective top and bottom rollers 55, 57 are journaled upon the carriage 21 between the side plates 49 by corresponding transverse, horizontal shafts 59 which extend through the rollers 55, 57 and are supported or journaled within the shaft mount blocks 61 located upon opposite sides of the carriage 21 and secured to the side plates 49 as shown in FIG. 7.

Arranged upon opposite sides of the side plates 49 and partly projecting through transverse apertures therein are longitudinally spaced pairs of side rollers 63 having vertical support shafts 59 which are supported and journaled within the vertically spaced shaft mount blocks 65 secured upon opposite sides of the side plates 49, as best shown in FIG. 7.

Figure 14:
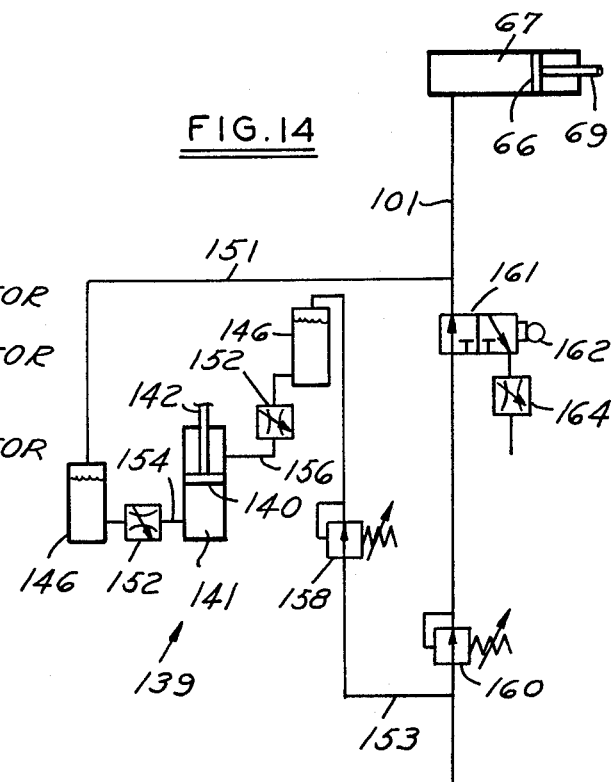
FIG. 14 is a schematic diagram of the pneumatic and hydraulic control circit or system of the car washing apparatuses.

Nested and enclosed within the boom 19 at one end in the upper compartment 46 is an elongated air cylinder 67 which includes a reciprocal piston 66 from which projects the reciprocal piston rod 69 as shown in FIG. 14. A vertical or upright shock mount plate 71 is connected axially to the cylinder 67 by the fastening means 73 and is secured to the free end of the boom 19 by suitable fastening means, FIGS. 7, 10 and 11. The shock mount plate 71 is provided with a direct acting shock absorber or damper 68 having the usual cylinder, piston and rod assembly and mounted on the plate 71 at the lower vertical edge thereof. The shock absorber 68 has a rod 70 provided with an enlarged head 72. A return spring 74 extends or biases the rod 70 out of the cylinder towards the pivoted end of the boom 19. The shock absorber 68 is adjustable to permit the compression or impact of the device 68 to be varied. The shock absorber 68 is located parallel to the boom 19 and in the path of movement of the carriage 21 so as to absorb the impact, force or energy generated by the carriage 21 striking or slamming against the back or free end of the boom 19. This could happen, as an example, when the rotating cloth wheel 23 moves or walks along the side of the car C, FIG. 2, from the position of FIG. 1. At such time it is possible for the rotating cloth wheel 23 to get hung up on the car bumper or bumper guard or trailer hitch with the result that the carriage 21 stops but the air cylinder 67 continues to urge the carriage 27 towards the back of the car C as in FIG. 3 and the cylinder 141 to be subsequently described, maintains a side pressure on the rotating wheel 23. The forces on the carriage 21 overcomes the forces of the stopped carriage thereby causing the carriage 21 to move and slam against the back or free end of the boom 19. As such time the shock absorber 68 absorbs the impact energy caused by the carriage striking the end of the boom.

The piston rod 69 at its free end mounts a clevis 77 which journals a first pulley 79 movably positioned within the upper compartment 46 of boom 19. Pulley amount 81 projects from the free end of the boom 19 and plate 71 as shown in FIGS. 10 and 11. The mount 81 journals a second pulley 83. A cable 85 at one end 87 is anchored to the carriage 21, FIGS. 7 and 10, extends around pulleys 83 and 79 and at its other end is anchored at 89 to the mount plate 71 of the boom 19. The cable system just described is unique in that there is a two to one advantage or relationship between the cylinder extension and the carriage travel. Thus for each one inch of movement of the rod 69 there is a two inch movement of the carriage 21.

The pneumatic cylinder 67 at one end has a port 99 connected by a conduit or hose 101 to a suitable source of pressurized air 103, FIGS. 8 and 14. A pair of longitudinally spaced rubber or flexible bumpers 91 and 93 are secured upon the carriage 21 adjacent its opposite ends and are adapted for alternate registry with stops provided on the boom 19 for limiting the travel of the carriage as will be subsequently discussed.

A bracket 95 is mounted and secured upon the top wall 43 of the boom 13 near the pivoted end of the boom as shown in FIG. 7. The bracket 95, as an example, has three parts and has sufficient apertures to supportably receive three hoses or conduits 97, two of which are connected to a source of hydraulic pressure 105, FIGS. 10 and 11, for activating the hydraulic motor 119 mounted upon the carriage 21 for rotating the scrubbing wheel 23.

An elongated wheel drive support tube 107, of rectangular cross section, depends from the carriage 21 and at its upper end extends between support arms 51, forming a part of the carriage 21, and is secured thereto, as an example, by welding. The support tube 107 has secured upon its upper end a top bearing mount 111, FIGS. 7 and 10, and at its lower end a bottom bearing mount 113 adapted to supportably receive and journal the scrubbing wheel drive shaft 115. The shaft 115 forms a part of scrubbing wheel 23 shown by FIGS. 1 through 5 inclusive and in detail in FIG. 8.

Figure 13:
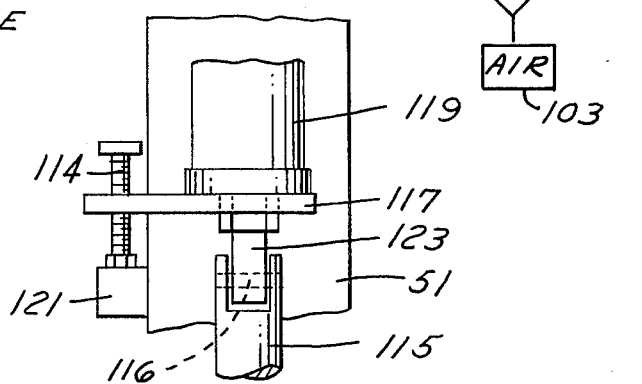
FIG. 13 is a fragmentary view illustrating the manner in which the hydraulic motor is connected to the shaft of the rotatable cloth scrubbing wheel.

A motor mount plate 117, FIGS. 10 and 13, is positioned between the support arms 51 forming a part of carriage 21 and is connected to the transverse torque bar 121 which extends between the support arms 51. The hydraulic motor 119, FIGS. 7 and 10, is nested between the arms 51 and secured to the motor mount plate 117. Hydraulic motor drive shaft 123 axially projects from the motor 119 and is axially coupled and secured to the wheel drive shaft 115 by a pin connection 116 or by other suitable coupling devices. A threaded adjustment bolt or element 114 is threadedly carried by the mount plate 117, with the end of the bolt 114 in contact with the torque bar 121 whereby the distance between the plate 117 and torque bar 121 may be varied.

It is regarded as equivalent that in the place of the hydraulic motor 119, an electric motor could be employed rotatably driving the wrap around scrubbing cloth wheel 23. In that case, the conduits 97 would be replaced by an electrical circuit connected to an electrical power source.

The present scrubbing cloth wheel 23 includes a cylindrical and sectional hub 125, usually made up by a series of 90° sectors which are secured upon a pair of longitudinally spaced spiders or other mountings, and are secured to the wheel drive 115 for rotation therewith. In the illustrative embodiment shown in FIG. 8, there is provided a plurality of sectional hubs 125 in alignment centrally supported upon the wheel drive shaft 115 and axially secured thereto.

The detail of construction at the present cloth scrubbing wheel 23 is shown in U.S. Pat. No. 4,018,014 dated Apr. 19, 1977 and U.S. Pat. No. 4,055,028 dated Oct. 25, 1977, both assigned to the assignee of record. These patents disclose the detailed construction of the scrubbing wheel 23 made up normally of a plurality of hub sections 125 to which a series of cloth packs 133 have been connected.

Formed along the length of each of the sectional hubs 125 are a plurality of elongated laterally spaced undercut grooves or channels 129 formed by extrusion, for illustration. A pack 133, for each groove 129 is provided containing cloth and including an elongated cylindrical bead 131 along one edge thereof which is adapted to be interlockingly received longitudinally within the corresponding undercut groove 129 to extend along the length of the respective hub 125. The cloth packs 133 provide when rotated a cloth scrubbing wheel adapted for operative cleaning engagement with surface portions of the body of the car C as the car C moves through the wash area 11 schematically shown in FIGS. 1 through 5 inclusive. When the scrubbing wheel 23 is stationary, it takes the form 134 substantially as shown in FIG. 7. When the wheel is rotated by the motor 119, due to centrifugal forces, the wheel 23 takes the open form shown in FIG. 8.

Depending from the boom 19 and particularly from the bracket 41, is a stop arm 135 adapted for registry with the adjustable stud and bumper assembly 137 secured by bracket 139 upon standard 17. Bumper 137 is adapted limit retracting movement of the boom 19 such as to the starting or first position shown in FIG. 1, as well as the finishing position shown in FIGS. 3 and 4 as will be further described.

Referring to FIGS. 7 and 14, a hydraulic cylinder 141 including a reciprocal piston 140 and attached piston rod 142, sometimes referred to as a first fluid control means, is pivotally mounted upon a vertical axis at 143 upon standard 17. The piston rod 142 is pivotally connected as at 145 by a clevis and pin connection to a portion of the boom 19 outwardly of its pivot assembly 33.

The cylinder or actuator 141 is incorporated in an air over oil control system or circuit 139 which includes a closed hydraulic circuit provided with a pair of upright spaced oil reservoirs 146. The reservoirs 146 are mounted upon angle brackets 148 secured to the upper end 143 of the cylinder 141. The lower end of each reservoir 146 is provided with an elbow 150 and a flow control valve 152. The hydraulic circuit includes a first conduit 154 which connects the lower end of one reservoir 146 to the cylinder fitting 149 provided at the piston end of the cylinder 141. The first conduit 154 is therefore interposed between the reservoir 146 and the cylinder 141 and has a flow control valve 152 therein as shown in FIGS. 7 and 14.

The hydraulic circuit also includes a second conduit 156 which connects the lower end of the second reservoir 146 to the cylinder fitting 147 at the rod end of the cylinder 141. The second conduit 156 is therefore interposed between the second reservoir 146 and the cylinder 141 and also has a flow control valve 152 therein as shown in FIGS. 7 and 14.

The main air conduit or passage 101 has a pair of first and second branch conduits 151 and 153 respectively. The first branch conduit leads from the main air passage or conduit 101 to the upper end of the first reservoir 146 while the second branch conduit 153 extends from the main air conduit 101 to the top end of the second reservoir 146 as shown in FIGS. 7 and 14.

The air over hydraulic oil system or circuit 139 as shown in FIG. 14 represents the combined air and oil circuits. The main air passage or conduit 101, as mentioned previously, is interposed between the air source 103 and the piston end of the pneumatic cylinder 67. Also provided in the main air conduit 101 is a conventional air filter 155 and an air lubricator 158 which are located in the system downstream from the juncture of the branch passage 153 with the main conduit 101. An adjustable pneumatic regulator 158 is interposed in branch passage 153 between the reservoir 146 and the juncture of the passages 153 and 101. A second adjustable pneumatic regulator 160 is located in the main air passage 101. The main passage 101 also includes a 3-way valve 161 which is under the control of a limit switch 162. The valve 161 is located in conduit 101 downstream of the juncture of passages 153 and 101. An adjustable needle valve 164 is provided to meter the air exhaust from the cylinders 67 and 141. The purpose of the air over oil control system or circuit is to provide a dampening feature which prevents the boom 19 from bouncing and controls boom movement in both directions.

Prior to discussing the operation of the car washing apparatus other structural and functional features will be described or further explained.

Figure 9:
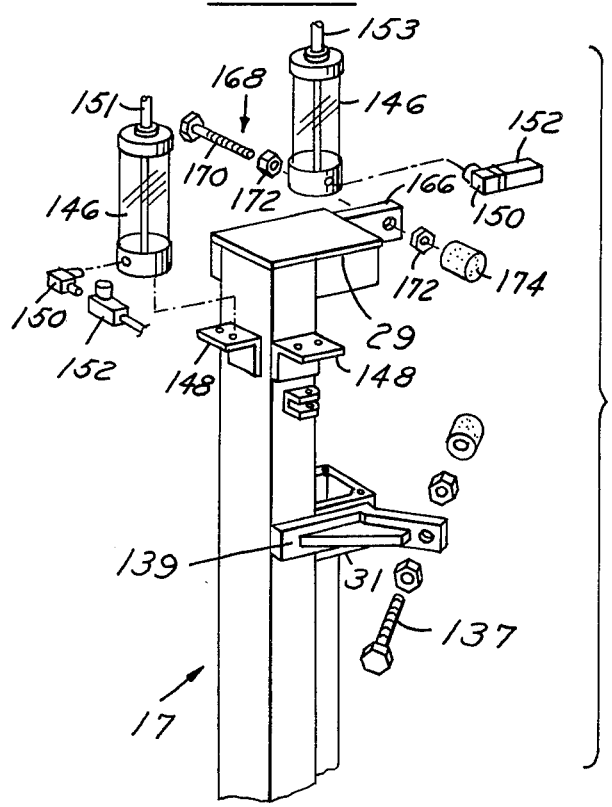
FIG. 9 is a fragmentary and partly assembled view of the upper end of the upright standard of the car washing apparatus and illustrating the manner in which the oil reservoirs and other component parts are mounted upon the upright standard.
Figure 12:
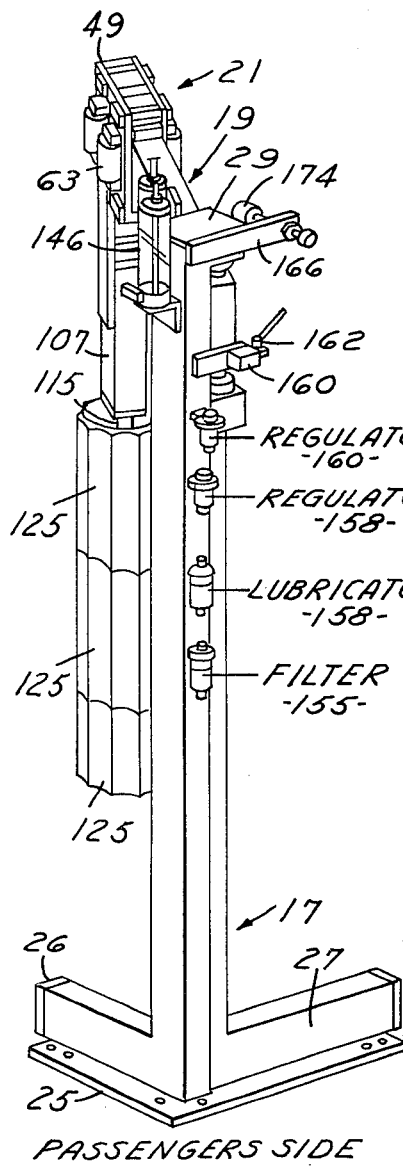
FIG. 12 is another perspective view of the car washing apparatus similar to FIG. 7 but looking at it in another direction.

First, the upper end of the standard 17, FIGS. 7, 9 and 12, is provided with a stop arm 166 which carries an adjustable stud assembly 168. Stud assembly 168 includes a positive stop stud 170, a pair of nuts 172 and a urethane bumper 174. The boom 19 has an upstanding stop bar 176 welded to the side wall 47. It extends upwardly above the top wall 43 and is so located to engage the bumper 174 of the stud assembly to limit the swing or movement of the boom 19.

The adjustable stud assembly 168 just described is similar in construction to the adjustable stud and bumper assembly 137 described previously. Thus each stud assembly 168 and 137 are provided to limit the outward travel of the boom 19 in the corresponding direction of movement.

The hose mount bracket 95, which overlies and is welded to the top wall 43 of the boom 19, serves a dual function. It not only carries the hoses 97 but also serves as a positive stop for upward travel of the carriage 21 along with the end or abutment surface 176 provided on the stop tube or bracket 41. Therefore, the hose mount bracket 95 and the stop tube or bracket 41 have abutment surfaces, located in the same vertical plane, for providing positive stops for engaging the opposing upper and lower end surfaces of the carriage 21.

The limit switch 162 for the 3-way valve 161 is also shown in FIGS. 6 and 12. The limit switch 162 is secured to a limit switch mount or plate 178. The plate 178 is mounted on and is secured to the stand or standard 17 near the bearing mount and pivot assembly 33 for the boom 19 as shown in FIG. 6. The limit switch 162 has a wand holder 180 which adjustably carries the movable limit switch wand 182. The wand 182 has an arc of 10° to 15° and will trigger the limit switch 162 to shift the three way valve 161 when the boom 19 strikes the wand 182 in response to car C movement or travel through the wash bay 11. The triggering generally occurs when the center line of the scrubbing wheel 23 is over the center line of the headlight of the car C.

The car washing apparatus 15 further includes a water delivery circuit or system, as shown in FIG. 7, which is connected to a source of water not shown.

Brackets 157 are secured to side plates 49 (FIG. 7), each mounting a hose fitting 159 adapted for receiving a portion of the hose or conduits for the delivery of water to the rotating scrubbing wheel 23. The water delivery system also includes a water delivery conduit or manifold 186 mounted on the inside vertical wall 188 of standard 17 by brackets 189 and provided with a pair of nozzles 190.

OPERATION

The operation of the present car washing apparatus 15 is schematically shown in FIGS. 1 through 5 inclusive wherein the respective car washing assemblies 15 are arranged upon opposite sides of a wash area or bay 11 adapted to sequentially engage the front portion of the body of the car C from the center and outwardly thereof, over side portions of the body as in FIG. 2, and an end portion thereof as shown in FIGS. 3 and 4.

The second car washing apparatus 15 shown in FIG. 4 is arranged rearwardly of the first car washing apparatus 15 of FIG. 1, so as to prevent interference between the corresponding cloth scrubbing wheels 23.

Referring to FIG. 7, initially upon activation of the first fluid control means or air cylinder 141, the boom 19 is retracted to the position shown in FIG. 1, sometimes referred to as a starting or first position where it extends at an acute angle to the vehicle path 13. The cloth scrubbing wheel 23 is initially arranged centrally of the car body at the front thereof, FIGS. 1 and 4 as indicated previously.

Air pressure is applied to the cylinder 141 whereby the piston rod 142 yieldably retains and biases the boom 19 in the starting or first position. At the same time, the air cylinder 67, sometimes referred to as a second fluid control means, is energized. On application of pressurized air to its port 99 from the pneumatic source 103, the piston rod 69 of cylinder 67 is advanced to the position shown in FIG. 10. Through the activation of the pulleys 79 and 83 and the cable 85, the carriage 21 is retracted to the starting or first position shown adjacent the free end of boom 19, corresponding to FIG. 1 and FIG. 7. This positions the power driven cloth scrubbing wheel 23, rotatable upon a vertical axis, in starting operative engagement with the front end of the body of car C shown in FIG. 1. As the car C is gradually advanced along the path 13, the scrubbing wheel 23, rotated in the direction of the arrows, moves laterally outward along the front portion of the vehicle body until it reaches the left front fender. Due to the rotating frictional action of the wheel 23 with respect to the body, the wheel 23 moves along the front end of the vehicle until it goes around the left front corner thereof so that the boom is gradually swung from the position shown in FIG. 1 to the position shown in FIG. 2, substantially parallel to the path 13. When boom 19 reaches the approximate position of the center line of the headlight, the limit switch 162 is activated resulting in the shifting of valve 161 and the venting or depressurizing of cylinder 67 and the rear port of the air-over oil cylinder 141.

Due to the frictional action between the scrubbing wheel 23 as it rotates with respect to the vehicle body, the carriage 21 moves along the boom 19 and operatively along the corresponding side or portion of the car body, such as to the position shown in FIG. 2. With the vehicle continuing to advance, the wheel 23 (as the carriage 21 is moving up and while the boom is moving in towards the vehicle C) reaches the left rear corner of the vehicle and the boom, due to the bias from cylinder 141 will return to the angular position or first position shown in FIG. 4.

With reference again to FIGS. 1–5 inclusive, FIG. 1 shows initial contact of the boom 19 with the wheel 23 in front of the automobile or car C. At this time the cylinder 67 that is inside the boom 19 is fully extended as in FIG. 8. The cylinder 141, which is on the outside of the boom 19 is extended and provides the side pressure on the outside of the car C. Initial contact between the apparatus 15 and car C tends to swing the boom 19 across the front and out away from the car C. At this time the cylinder 141 that is outside the boom 19 and the oil system 139 provides side pressure and a dampening effect on the boom 19 which keeps the scrubbing wheel 23 in contact with the automobile throughout the operation of the car washing apparatus 15. When the scrubbing wheel 23 comes across the front portion of the vehicle or car C, the boom 19 is pointing out, away from the car C. At such time the boom actuates the wand 182 of limit switch 162 to shift the 3-way valve 161. As a result thereof the air pressure on cylinder 67 located inside boom 19 is released, At this time there is no air pressure on cylinder 67 and as a result thereof the wheel carriage 21 moves freely up the boom 19 towards the pivoted end thereof as a result of the rotation of the scrubbing wheel 23 on the side of the body of the car C as shown in FIG. 2.

As represented by FIG. 2 as the rotating wheel 23 encounters resistance by the body of the car the rotation of wheel 23 tends to move the whole carriage 21 freely up the boom. The air pressure during such movement is still applied to the boom cylinder 141 which holds the rotating wheel against the car body and dampens the vibrations of the boom. Thereafter the boom 19 swings back towards the middle of the wash bay or area 11.

As shown in FIG. 3, when the wheel 23 reaches the entire travel up the boom and the boom 19 is swinging in towards the middle of the bay 11, the air limit switch 162 is tripped again which shifts valve 161 and directs or returns the air pressure to the large cylinder 67 located inside the boom 19. At this point, the boom 19 is again swung into the middle of the wash area 11; the air pressure has been applied to the cylinder 67; and now the wheel carriage 21 wants to move down the boom again and follow the rear portion of the automobile C.

Referring again to FIGS. 1–5 inclusive and FIG. 14 of the patent drawings, the initial contact of the front of the automobile with the wheel 23 is as light in pressure as possible. In order to accomplish this objective one air line or conduit is tied into both cylinders 141 and 67 as shown in the schematic drawing of FIG. 14. The initial contact between the car and wheel is as light as possible as the scrubbing wheel walks across the front of the automobile. When the wheel 23 gets right about to the corner of the front border panel of the car about the headlight area the limit switch 162 is triggered to release the air pressure on the cylinder 67 located inside the boom 19. At the same time the air pressure is also released on cylinder 141. In cylinder 141 the air pressure is released from the back of the cylinder which allows only one side of the cylinder 141 to feed the air pressure. This increases the wheel force on the side of the automobile C. Providing the air pressure on the oil at two sides of the cylinder 141 tend to equalize and result in a pressure as light as possible.

As the wheel carriage 21 moves through FIG. 2, the air pressure is released on the inside cylinder 67 and allows the wheel carriage 21 to move up the boom 19. As the wheel carriage 21 moves up the boom 19, the boom 19 tends to swing back in towards the middle of the wash area 11. At that time, the limit switch 162 is released or is not triggered by wand 182. As a result thereof the air pressure is redirected back to cylinder 67 and to the other side of cylinder 141. At this time the wheel carriage 21 tends to be forced down the boom 19 whereby the rotating wheel 23 follows the rear of the car C and washes it.

As the operation of the wrap around wheel 23 progresses, the movement of the boom 19 is controlled by the oil reservoirs 146 which are connected to cylinder 141. Each oil reservoir 146 has a flow control 152 that is adjustable to increase or decrease the dampening effect that the automobile has on the unit or wheel itself. This controls the amount that the boom 19 would swing away from the car C or the boom would swing into the car C. It also controls the rate of the speed at which this happens. Thus there is provided a full control over the boom 19 swinging in and out as limited by the corresponding stops.

Referring again to FIG. 14, only one side of the cylinder 67 is connected to air while in cylinder 141 the hydraulic oil is connected to both sides of the cylinder 141.

Regulators 158 and 160 of the air-oil system 139 are adjustable so that the line pressure of the system can be varied.

Thus the limit switch 162 is operated by the movement of the boom 19 as shown in FIG. 1. The air pressure is released from the cylinders 67 and 141 and this is done by the movement of the boom 19 which actually activates the limit switch 162 as between FIGS. 2 and 3. As the car C progresses down the wash area 11 the boom 19 swings back in towards the middle of the area 11 and the limit switch 162 is now released and the air pressure is placed back on the two cylinders as in FIG. 4.

As the limit switch 162 dumps the valve 161, as the boom swings out away or off from the car and the limit switch 162 is activated, it releases the air pressure on cylinder 67 and cylinder 141. The release of the air is metered through the needle valve 164 with flow control which is in effect a small orifice which is adjustable. Thus the operator can adjust the rate at which the air is released and this controls the part of the movement of the wheel carriage 21 up the boom 19. Such a control insures that the carriage 21 doesn't ride up the boom 19 excessively.

The same action just described is occurring upon the opposite side of the car C through the second car washing apparatus 15 shown in FIG. 4, which engages the front portion of the car body from its opposite side a time period after the left portion of the body has been engaged by the first car washing apparatus 15 shown in FIG. 1.

It is the frictional engagement of the scrubbing wheel 23 rotated in the direction of the arrow shown in FIG. 1, and in the opposite direction of rotation shown by the arrow in FIG. 4, which causes the wheel 23 to cling to and to move along the side portions of the vehicle body with the carriage 21 freely movable upon the booms 19. Here also a limited pressure is involved in connection with the second fluid control means or cylinder 67, so that there is a constant but yieldable bias of the carriage 21 towards the starting or first position shown in FIGS. 1, 3 and 4.

The air pressure applied to the cylinders 141 and 67 maintain light loads on the front, side and rear of the car C that are necessary for washing and scrubbing the vehicle body with the cloth wheels 23. The precision head assembly or carriage 21 on the overhead boom 19, glides around the vehicle C at line speeds up to over 200 cars per hour, as an example.

The use of a plurality of aligned wheel hub sections 125 permits the washing of vehicles C whose bodies are of increased height such as for vans and the like. As illustrative of the operation of the present wash assembly hydraulic fluid is provided from the hydraulic source 105, through the lines 97 to the hydraulic motor 119, as an example, at 6 gallons per minute. The air pressure provided to the cylinders 141 is 60 pounds per square inch for illustration. Cylinder 67 has air pressure, as an example, at approximately 23 pounds per square inch.

We claim:

1. A car washing apparatus for successively scrubbing the front, a side and the rear of a vehicle body during movement along a predetermined path comprising:

an upright standard adapted for mounting upon a floor surface laterally of said path;

a horizontal boom pivotally mounted at one end upon said standard on a generally vertical axis and having the other end free;

a wheel mounting carriage guidably and movably mounted upon said boom between said ends longitudinally thereof;

a motor mounted on said carriage for movement therewith and having a generally vertical drive shaft;

a scrubbing wheel connected to said drive shaft and depending from said carriage and rotated by said motor about a vertical axis and in a predetermined direction;

said boom having a first position where it extends across said path, with said carriage located at or near the free end thereof and said rotating wheel arranged near said path and adapted for registry with the vehicle to scrub either the front or rear of the vehicle body;

said boom having a second position where it extends substantially parallel to said path at one side of the vehicle body, with said rotating wheel in registry with the side of the vehicle body and said carriage being adapted to move freely toward said one end of said boom as the wheel scrubs the side of the vehicle body as a result of contact between the rotating wheel and the moving vehicle;

a fluid control system including first and second fluid control means;

said first fluid control means being connected between said boom and said standard for controlling angular movement of said boom between said first and second positions;

and said second fluid control means being connected between said boom and said carriage for controlling movement of said carriage on said boom in one direction from said one end towards said free end thereof.

2. In the car washing apparatus of claim 1, a base on said standard including a pair of right angularly related base members extending respectively towards said path and parallel to said path.

3. In the car washing apparatus of claim 2, said base including a base plate underlying and secured to said base members.

4. In the car washing apparatus of claim 1, the pivotal mounting of said boom including a pair of parallel spaced trunnion mount tubes mounted upon said standard at its upper end;

opposed bearings mounted upon said tubes;

and a vertical pivot pin extending through said boom and at its ends positioned within and supported upon said bearings.

5. In the car washing apparatus of claim 1, said boom including a tube of rectangular cross section having horizontal top and bottom walls with vertical side walls;

and spaced pairs of rollers journaled upon said carriage in horizontal and vertical planes for cooperative engagement with the top, bottom and sides of said boom.

6. In the car washing apparatus of claim 1, said first fluid control means includes a hydraulic cylinder pivoted at one end upon said standard and a piston rod pivotally connected to said boom;

said cylinder being connected to a source of pressurized hydraulic fluid for yieldably biasing said boom in one direction.

7. In the car washing apparatus of claim 6, including an adjustable stop mounted upon said standard and engageable with said boom for limiting the movement of said boom.

8. In the car washing apparatus of claim 6, said second fluid control means including an air cylinder coaxial of and mounted within said boom at its free end and connected thereto;

said air cylinder having therein a reciprocal piston and piston rod, with one end of said reciprocal piston rod mounting a first pulley exteriorly of said air cylinder;

said piston rod and first pulley being mounted to move together relative to the free end of said boom;

a second pulley journaled upon the free end of said boom;

and a cable at one end secured to said carriage, extending over and around said pulleys and at its other end secured to said boom, said air cylinder being connected to a source of air under pressure for yieldably extending said last mentioned piston rod and said first pulley thereby positioning said carriage towards the free end of said boom.

9. In the car washing apparatus of claim 1 wherein said first fluid control means includes a first cylinder and piston rod assembly, with the cylinder pivoted at one end upon said standard and the rod pivotally connected to said boom;

a pair of hydraulic reservoirs mounted upon said standard;

a pair of reservoir conduits at their one ends connected to the lower ends of said reservoirs, and at their other ends respectively connected to opposite ends of said cylinder assembly;

a main air passage;

a source of air under pressure connected to said main air passage;

first valve means located in said main air passage, a pair of branch air passages, one branch passage connected on one end to said main air passage upstream of said first valve means and on the other end to the upper end of one of said reservoirs; and the other branch passage connected on one end to said main air passage downstream of said first valve means and on the other end to the upper end of the other of said reservoirs for selectively delivering pressurized hydraulic fluid alternatively to opposite ends of said cylinder assembly for actuating same thereby moving said boom between said first and second positions.

10. In the car washing apparatus of claim 9, said first valve means having a movable valve element normally biased to a first position, one of said reservoir conduits pressurizing one reservoir for maintaining said cylinder assembly in a first position corresponding to the first position of said boom;

said first valve means including a pilot actuator for moving said valve element upon receipt of a signal to said first position;

said valve element on interruption of said signal adapted to be biased to a second valve position for pressurizing the other reservoir, in turn advancing the piston rod of said cylinder assembly and moving said boom to its second position.

11. In the car washing apparatus of claim 1, including resilient stops mounted upon said boom at its free end and adjacent its other end alternately engageable by said carriage.

12. In the car washing apparatus of claim 1, said second fluid control means including an air cylinder coaxial of and mounted within said boom at its free end and connected thereto;

said air cylinder having therein a reciprocal piston and piston rod, with one end of said reciprocal piston rod mounting a first pulley exteriorly of said air cylinder;

said piston rod and first pulley being mounted to move together relative to the free end of said boom;

a second pulley journaled upon the free end of said boom;

and a cable at one end secured to said carriage, extending over and around said pulleys and at its other end secured to said boom, said air cylinder being connected to a source of air under pressure for yieldably extending said last mentioned piston rod and said first pulley thereby positioning said carriage towards the free end of said boom.

13. In the car washing apparatus of claim 1, said scrubbing wheel including an upright wheel drive shaft;

the mounting of said wheel including an upright tubular support at one end secured to and depending from one end of said carriage;

said wheel drive shaft extending through, journaled and supported upon said tubular support and depending therefrom;

said motor drive shaft being axially coupled to said wheel drive shaft.

14. In the car washing apparatus of claim 13, said carriage including a pair of spaced upright side walls;

upright support arms depending from said side walls as an extension thereof;

said motor being housed within said support arms;

said upright tubular support extending upwardly between said support arms and secured thereto.

15. In the car washing apparatus of claim 13, said scrubbing wheel including a cylindrical hub axially receiving and mounted upon said wheel drive shaft for rotation therewith;
there being a series of parallel spaced longitudinal undercut grooves in said hub along its length;
and a pack for each groove containing cloth and including an elongated cylindrical bead which is nested and retained in the groove, with the packs being mounted around the circumference of said hub.

16. In the car washing apparatus of claim 1, said motor being a hydraulic motor connected to a source of hydraulic fluid under pressure.

17. In the car washing apparatus of claim 1, wherein a shock absorber is mounted on the free end of said boom and is engageable by said carriage for absorbing the energy generated when said carriage is moved against the free end of said boom.

18. In the car washing apparatus of claim 17, said shock absorber including a piston rod and cylinder assembly mounted parallel to said boom and affixed to an end plate connected to the free end of said boom, said cylinder assembly containing a spring which returns the piston rod after the impact has been removed.

19. In the car washing apparatus of claim 18 wherein said piston rod and cylinder assembly is adjustable to vary the resistance thereof to the impact of said carriage.

* * * * *